United States Patent
Hong et al.

(10) Patent No.: US 9,304,626 B2
(45) Date of Patent: Apr. 5, 2016

(54) DISPLAY DEVICE AND OPTICAL TOUCH SYSTEM INCLUDING THE SAME

(71) Applicant: Samsung Display Co., Ltd., Yongin (KR)

(72) Inventors: Won-ki Hong, Suwon-si (KR); SeungHo Nam, Seongnam-si (KR); Jaeho You, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 468 days.

(21) Appl. No.: 13/948,528

(22) Filed: Jul. 23, 2013

(65) Prior Publication Data

US 2014/0292722 A1  Oct. 2, 2014

(30) Foreign Application Priority Data

Mar. 27, 2013  (KR) .................. 10-2013-0032905

(51) Int. Cl.
*G06F 3/042* (2006.01)
*G06F 3/03* (2006.01)
*G06F 3/0354* (2013.01)

(52) U.S. Cl.
CPC .............. *G06F 3/042* (2013.01); *G06F 3/0321* (2013.01); *G06F 3/03542* (2013.01)

(58) Field of Classification Search
None
See application file for complete search history.

(56) References Cited

U.S. PATENT DOCUMENTS

| | | | |
|---|---|---|---|
| 4,878,553 A | 11/1989 | Yamanami et al. | |
| 2010/0155153 A1 | 6/2010 | Zachut | |
| 2010/0326803 A1* | 12/2010 | Um | H03K 17/9629 200/312 |
| 2011/0068256 A1 | 3/2011 | Hong et al. | |
| 2011/0163997 A1 | 7/2011 | Kim | |

FOREIGN PATENT DOCUMENTS

| | | |
|---|---|---|
| JP | 08-044483 | 2/1996 |
| JP | 11-119898 | 4/1999 |
| JP | 2002-149329 | 5/2002 |
| JP | 2002-287900 | 10/2002 |
| KR | 10-2010-0037544 | 4/2010 |
| KR | 10-2010-0138142 | 12/2010 |
| KR | 10-2011-0052961 | 5/2011 |

* cited by examiner

*Primary Examiner* — Nicholas Lee
(74) *Attorney, Agent, or Firm* — H.C. Park & Associates, PLC

(57) ABSTRACT

An optical touch system includes: a coordinate processor; a display device; and an optical element. The optical element is configured to emit light towards the display device and provide information about reflected light corresponding to a portion of the emitted light to the coordinate processor. The display device includes: a display panel configured to display an image, a touch substrate disposed on the display panel, the touch substrate including optical recesses each configured to reflect respectively different amounts of incident light, and a protective layer disposed on the touch substrate. The coordinate processor is configured to determine a touch or near-touch coordinate based on the information received from the optical element.

27 Claims, 10 Drawing Sheets

DISPLAY DEVICE AND OPTICAL TOUCH SYSTEM INCLUDING THE SAME

CROSS-REFERENCE TO RELATED APPLICATION

This application claims priority from and the benefit of Korean Patent Application No. 10-2013-0032905, filed on Mar. 27, 2013, which is incorporated by reference for all purposes as if set forth herein.

BACKGROUND

1. Field

Exemplary embodiments relate to display devices and optical touch technology. More particularly, exemplary embodiments relate to a display device that does not need touch electrodes and/or optical sensors to sense touch and/or "near touch" events and a display device including the same.

2. Discussion

Touch panels are often utilized as one of many conventional interfaces that provide communications between an information communication technology device and a user. Touch panels are a type of input device that transmit touch information, which is generated in response to a user's finger or touch tool coming in contact with and/or close proximity to the touch panel (hereinafter collectively referred to as "touch events"), to the information communication technology device. Typically, touch panels are included as component of or an addition to a display device. In this manner, touch panels enable users to interact with content presented via the display device. Due to the relative ease and intuitiveness of operation, display devices including or otherwise interfacing with touch panels have found industrial application in various fields of technology, such as, for example, mobile phones, personal digital assistants, bank/office terminals, medical devices, directional boards, traffic information boards, etc.

Conventionally, touch panels are generally classified into three types based on their operating principles, e.g., a resistive pressure-sensitive type, a capacitive/electrostatic type, and an infrared light type. Traditional infrared light type touch panels generally utilize a separate optical sensor in the touch panel to sense (or otherwise detect) touch events, whereas conventional resistive pressure-sensitive type touch panels and traditional capacitive/electrostatic type touch panels typically utilize separate touch electrodes to sense touch events. These separate optical sensors/touch electrodes add to the cost, complexity, and time to manufacture information communication technology devices including such components. Therefore, there is a need for an approach that provides efficient, cost effective techniques to improve upon conventional display devices and optical touch systems including the same.

The above information disclosed in this Background section is only for enhancement of understanding of the background of the present disclosure, and, therefore, it may contain information that does not form the prior art that is already known in this country to a person of ordinary skill in the art.

SUMMARY

Exemplary embodiments provide a display device that does not need to include touch electrodes or optical sensors to sense touch events, as well as provide an optical touch system including the display device.

Additional aspects will be set forth in the detailed description which follows and, in part, will be apparent from the disclosure, or may be learned by practice of the invention.

According to exemplary embodiments, a display device includes: a display panel configured to display an image; a touch substrate disposed on the display panel, the touch substrate including optical recesses each configured to reflect respectively different amounts of incident light; and a protective layer disposed on the touch substrate.

According to exemplary embodiments, an optical system includes: a coordinate processor; a display device; and an optical element configured to emit light towards the display device and provide information about reflected light corresponding to a portion of the emitted light to the coordinate processor. The display device includes: a display panel configured to display an image, a touch substrate disposed on the display panel, the touch substrate including optical recesses each configured to reflect respectively different amounts of incident light, and a protective layer disposed on the touch substrate. The coordinate processor is configured to determine a touch or near-touch coordinate based on the information received from the optical element.

According to exemplary embodiments, the display device does not need to include separate optical sensors and/or separate touch electrodes, but, instead, utilizes the aforementioned touch substrate and coordinate processor to sense touch events. As such, the cost, complexity, and time to manufacture the display device may be reduced. In addition, since the display device does not require separate touch electrodes, one or more masks typically required to form the touch electrodes are not needed. Therefore, the cost, complexity, and time to manufacture the display device may be further reduced.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Figure 1:
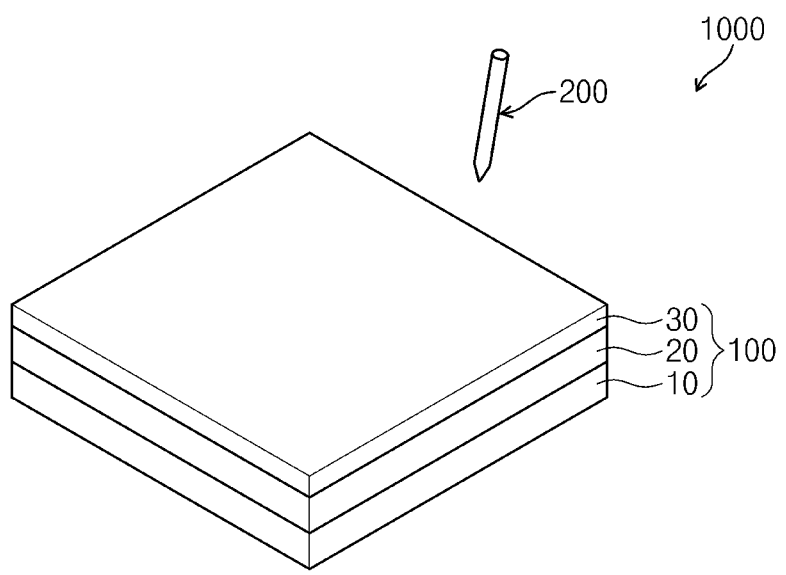
FIG. 1 is a perspective view of an optical touch system, according to exemplary embodiments.

DETAILED DESCRIPTION OF THE
ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes, and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the," are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art, and will not be interpreted in an idealized or overly formal sense, unless expressly so defined herein.

While exemplary embodiments are described in association with liquid crystal display devices, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may include electrophoretic displays (EPD), electrowetting displays (EWD), etc.

Figure 2:
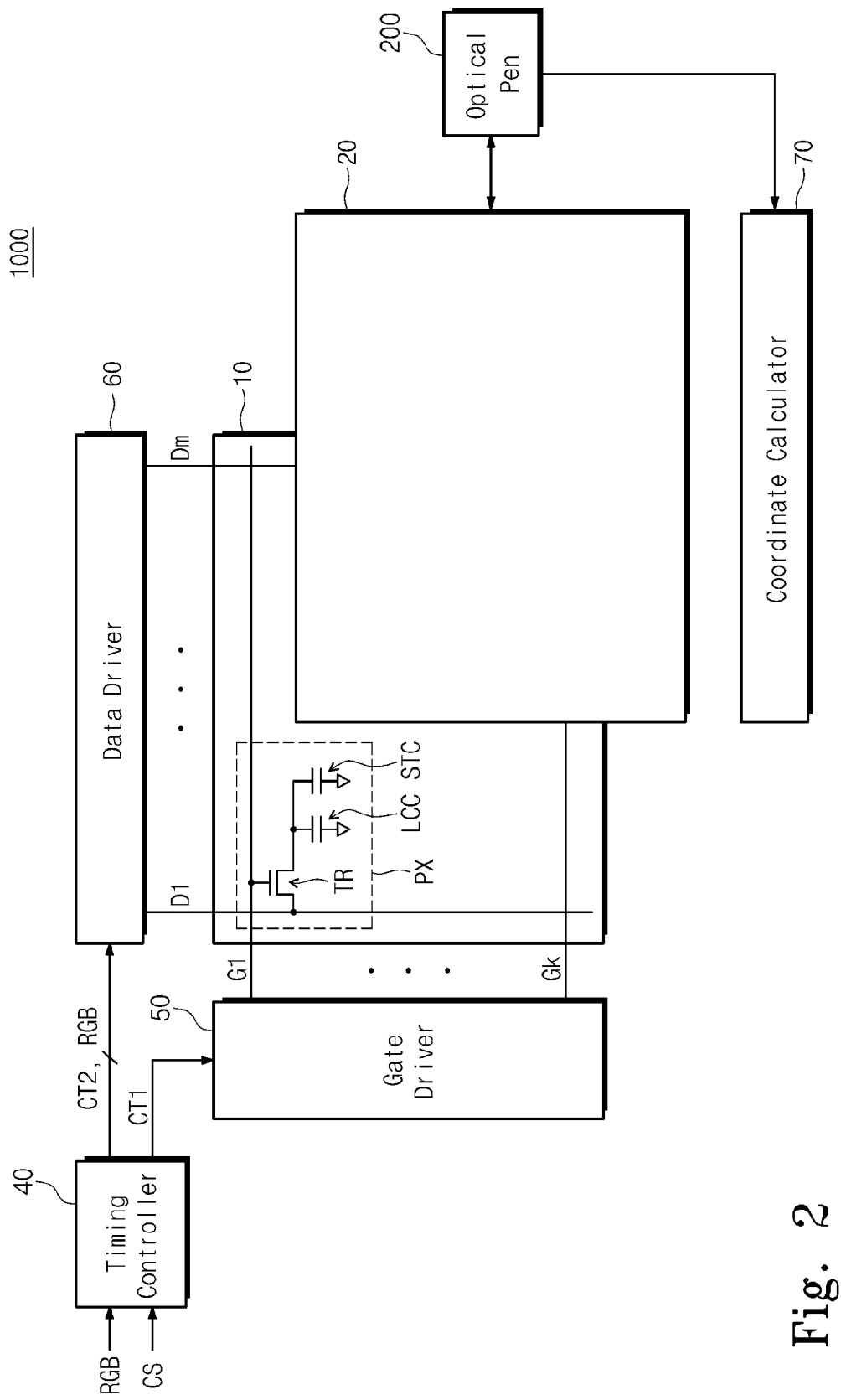
FIG. 2 is a block diagram of the optical touch system of FIG. 1, according to exemplary embodiments.

FIG. 1 is a perspective view of an optical touch system 1000, according to exemplary embodiments. FIG. 2 is a block diagram of the optical touch system 1000 of FIG. 1.

Referring to FIG. 1, the optical touch system 1000 includes a display device 100 and an optical pen (or element) 200. While specific reference will be made to this particular implementation, it is also contemplated that the optical touch system 1000 may embody many forms and include multiple and/or alternative components.

According to exemplary embodiments, the display device 100 is configured to display an image. To this end, a touch event may occur on (or near) a first (e.g., upper) surface of the display device 100 by, for instance, the optical pen 200.

The display device 100 includes a display panel 10, a touch substrate 20, and a protective layer 30, a gate driver 50, a data driver 60. In exemplary embodiments, the display device 100 may also include (or interface with) a timing controller 40 and a coordinate calculator (or processor) 70.

According to exemplary embodiments, the display panel 10 may be any suitable display device, such as, for instance, a liquid crystal display panel. It is contemplated, however, that any other suitable display panel may be utilized, such as, for example, an OLED panel, a PDP, an EPD panel, an EWD panel, and/or the like.

Further, the display device 100 may also include a backlight assembly (not shown) configured to supply light to the display panel 10. The display panel 10 may operate according to a vertical alignment (VA) mode, a patterned vertical alignment (PVA) mode, an in-plane switching (IPS) mode, a fringe-field switching (FFS) mode, a plane-to-line switching (PLS) mode, and/or the like. In this manner, the display panel 10 may be operated and/or configured in any suitable manner to display an image(s).

As seen in FIG. 2, the display panel 10 includes a plurality of gate lines G1 to Gk configured to receive gate signals and a plurality of data lines D1 to Dm configured to receive data voltages. It is noted that "k" and "m" are natural real numbers greater than zero; however, it is also noted that "k" may or may not be equal to "m." In exemplary embodiments, the gate lines G1 to Gk are insulated from the data lines D1 to Dm and cross the data lines D1 to Dm. For instance, the gate lines G1 to Gk may longitudinally extend in (or substantially in) a perpendicular direction to the longitudinal extension of data lines D1 to Dm. To this end, the display panel 10 includes a plurality of pixel areas arranged in, for instance, a matrix (or any other suitable) formation, such that one or more pixels (or sub-pixels) are arranged in the pixel areas, respectively. For instance, FIG. 2 depicts an equivalent circuit diagram of one pixel PX among the pixels PX and/or sub-pixels. The pixel PX may include, for example, a thin film transistor TR, a liquid crystal capacitor LCC, and a storage capacitor STC.

Although not shown in figures, the thin film transistor TR includes a gate electrode, a source electrode, and a drain electrode. The gate electrode is connected to a first gate line G1 of the gate lines G1 to Gk. The source electrode is connected to a first data line D1 of the data lines D1 to Dm. The drain electrode is connected to the liquid crystal capacitor LCC and the storage capacitor STC. The liquid crystal capacitor LCC and the storage capacitor STC are connected to the drain electrode in parallel.

Furthermore, while not illustrated, the display panel 10 may include a first display substrate, a second display substrate facing the first display substrate, and a liquid crystal layer disposed between the first display substrate and the second display substrate.

The gate lines G1 to Gk, the data lines D1 to Dm, the thin film transistor TR, and a first electrode (not shown) of the liquid crystal capacitor LCC are disposed on, for instance, the first display substrate. The thin film transistor TR is configured to apply the data voltage to the first electrode in response to reception of a gate signal.

A second electrode (not shown) of the liquid crystal capacitor LCC is disposed on, for example, the second display substrate, and a reference voltage may be applied to the second electrode. The second display substrate may further include, according to exemplary embodiments, one or more color filters (not shown) and a black matrix (not shown).

In exemplary embodiments, the liquid crystal layer is disposed between the first electrode and the second electrode to serve as a dielectric substance. The liquid crystal capacitor LCC is charged with a voltage corresponding to an electric potential difference between the data voltage and the reference voltage.

The timing controller 40 is configured to receive image signals RGB and control signals CS from a graphic controller (not shown), such as an external graphic controller. In this manner, the timing controller 40 is configured to generate, for example, a first control signal CT1 and a second control signal CT2 in response to the reception of the control signals CS, e.g., a vertical synchronization signal, a horizontal synchronization signal, a main clock signal, a data enable signal, etc.

According to exemplary embodiments, the first control signal CT1 may be a gate control signal to control operation of the gate driver 50. The first control signal CT1 may include, for instance, a gate clock signal and a vertical start signal. The second control signal CT2 may be a data control signal to control operation of the data driver 60. The second control signal CT2 includes, for example, a horizontal start signal to start operation of the data driver 60, an inversion signal to invert a polarity of the data voltage, and an output indicating signal to determine an output timing of the data voltage from the data driver 60.

The gate driver 50 is electrically connected to the gate lines G1 to Gk, disposed on, for instance, the display panel 10, and configured to apply the gate signals to the gate lines G1 to Gk. For example, the gate driver 50 is configured to generate the gate signals to drive the gate lines G1 to Gk based on the first control signal CT1 and sequentially output the gate signals to the gate lines G1 to Gk.

The data driver 60 is configured to apply the data voltages, which may be generated based on converting the image signals RGB output from, for example, the timing controller 40 to the data lines D1 to Dm based on the second control signal CT2.

According to exemplary embodiments, the touch substrate 20 is disposed on the display panel 10. The touch substrate 20 includes a plurality of optical recesses (not shown) formed therein. The optical recesses are configured to reflect at least a portion of incident light. The touch substrate 20, including the optical recesses, is described in more detail in association with FIGS. 3-8.

The protective layer 30 is disposed on the touch substrate 20. The protective layer 30 may be formed of any suitable transparent (or substantially transparent) material to protect the touch substrate 20 from environmental factors, such as, for example, moisture, debris, etc. For instance, the protective layer 30 may be formed of glass, plastic, etc.

According to exemplary embodiments, the optical pen (or element) 200 may be any suitable optical touch input device; however, it is contemplated that the optical pen 200 may be or include any other suitable device configured to perform one or more of the features/functions described herein. The optical pen 200 is configured to emit, for example, an infrared ray towards an upper surface of the display device 100, and sense an amount of the infrared ray reflected by the display device back to the optical pen 200. The optical pen 200 is configured to provide information about the amount of the reflected infrared ray to the coordinate calculator 70. This is described in more detail in association with FIGS. 10 and 11.

In exemplary embodiments, the coordinate calculator (or processor) 70 is configured to calculate (or otherwise determine) a coordinate of a position at which a touch event occurs (hereinafter, referred to as a "touch coordinate") based on information received about the amount of the reflected infrared ray. According to exemplary embodiments, the coordinate calculator 70 may be a component of display device 100 or may interface with display device 100. For instance, an apparatus (not shown), such as a mobile phone, may incorporate the display device 100 as a component thereof. In this manner, the features/functions of the coordinate calculator 70 may be executed (or otherwise carried out) by one or more processors of the apparatus. To this end, the optical pen 200 may be configured to provide information about the amount of the reflected infrared ray to the one or more processors of the apparatus to effectuate one or more of the features/functions/processes described herein.

Although not shown in the figures, the display device 100 may further include a touch panel. The touch panel may be a capacitance-type touch panel, and, as such, the touch panel may be configured to sense (or otherwise detect) touch events generated by a touch input tool instead of the optical pen 200. For instance, the touch input tool might be a stylus, a portion of user's body, etc. The touch panel may be disposed between the first display substrate and the second display substrate or disposed on the second display substrate.

According to exemplary embodiments, the timing controller 40, the gate driver 50, the data driver 60, and/or the coordinator calculator 70 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

In exemplary embodiments, the processes described herein to facilitate the detection of touch events via optical system 1000 may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the optical touch system 1000 may include or otherwise be associated with one or more memories (not shown) including code (e.g., instructions) configured to cause the optical touch system 1000 to perform one or more of the features/functions/processes described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 3:
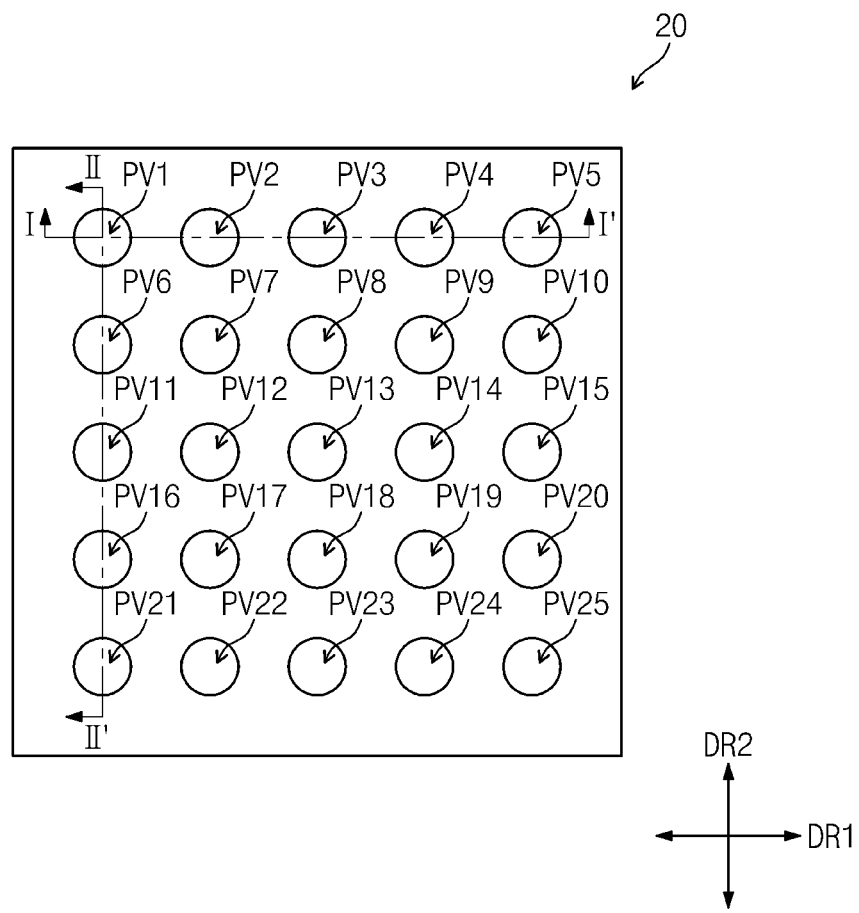
FIG. 3 is a plan view of a touch substrate of the optical system of FIG. 1 according to exemplary embodiments.

FIG. 3 is a plan view of the touch substrate 20 of the optical system of FIG. 1, according to exemplary embodiments.

Referring to FIG. 3, the touch substrate 20 includes optical recesses PV1 to PV25. It is noted that while twenty-five optical recesses PV1 to PV25 are shown, it is contemplated that exemplary embodiments may utilized any suitable number of optical recesses. The optical recesses PV1 to PV25 have an engraved shape formed by etching, digging, burning, cutting, or otherwise removing an upper surface of the touch substrate 20 to a desired depth. In exemplary embodiments, each of the optical recesses PV1 to PV25 has a reversed cone shape or a reversed-truncated cone shape. The optical recesses PV1 to PV25 are arranged in first and second directions DR1 and DR2, and, thereby, are spaced apart from each other in, for instance, a matrix or any other suitable arrangement. In addition, the optical recesses PV1 to PV25 may have the same plane shape and the same area. That is, the areas of the upper circles of the optical recesses PV1 to PV25 at an upper surface of the touch substrate 20 may be the same, such that each of the optical recesses PV1 to PV 25 has the same reversed cone shape or the same reversed-truncated cone shape (or frustum). It is contemplated, however, that one or more of the optical recesses PV1 to PV25 may be differently formed than one or more of the other optical recesses. For instance, each optical recess may have a same cross-sectional shape at an upper surface of the touch substrate 20, but the depths of one or more of the optical recesses PV1 to PV25 may be different. As another example, one or more of the optical recesses PV1 to PV2 may have a different cross-sectional shape at an upper surface of the touch substrate and/or a different depth as one or more of the other optical recesses PV1 to PV25.

According to exemplary embodiments, the optical recesses PV1 to PV25 are arranged in a matrix form of j ("j" being a natural, real number) rows by h ("h being a natural, real number) columns. As seen in FIG. 3, the matrix formation includes five optical recesses arranged in each of the first and second directions DR1 and DR2. It is contemplated, however, that any other suitable arrangement may be utilized, such as a matrix formation where j does not equal h, a "staggered" formation, etc.

As will become more apparent below, the optical recesses PV1 to PV25 are configured such that, even though the amount of incident light to the optical recesses PV1 to PV25 is constant, the amount of reflected light from the optical recesses PV1 to PV25 may be different depending on the optical recess PV1 to PV25 in question.

Figure 4:
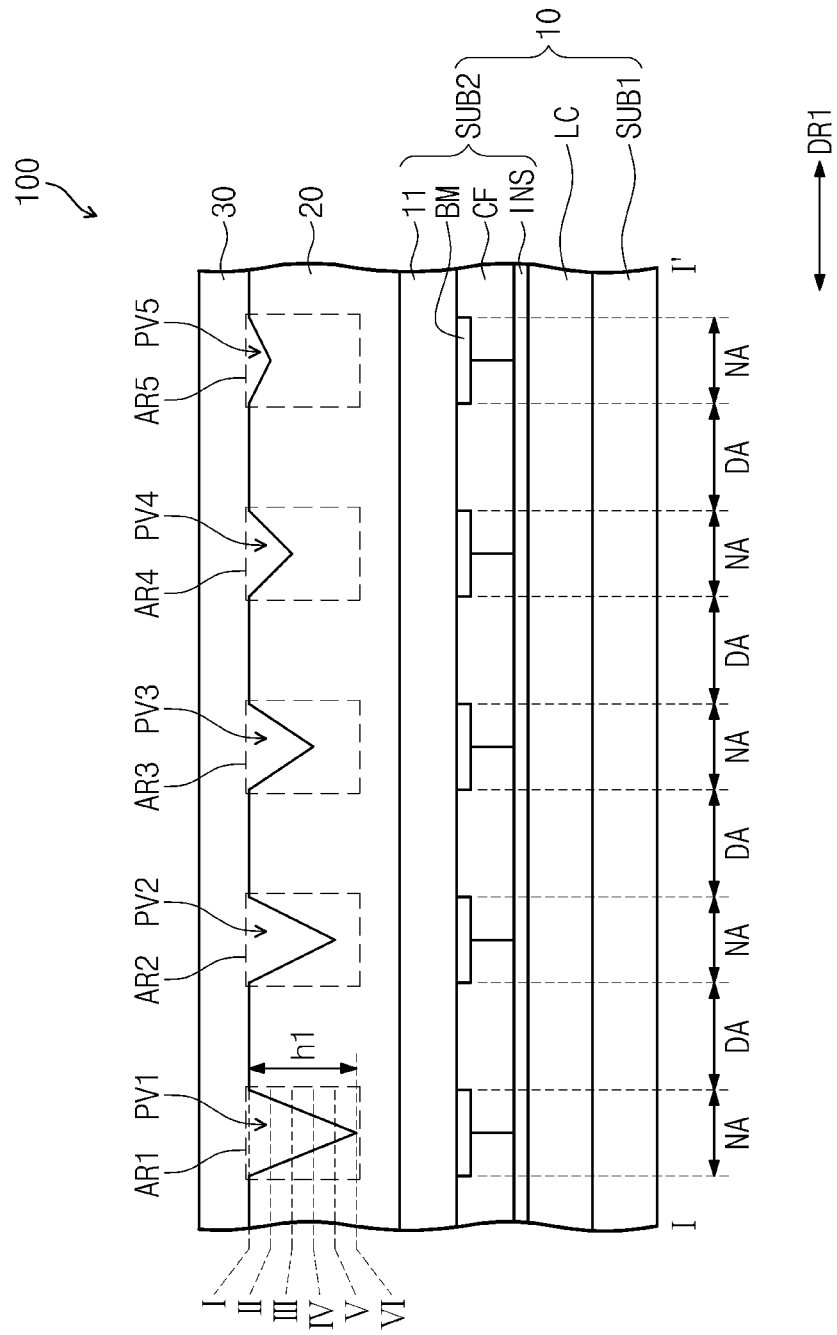
FIG. 4 is a cross-sectional view of the touch substrate of FIG. 3 taken along sectional line I-I', according to exemplary embodiments.

FIG. 4 is a cross-sectional view of the touch substrate of FIG. 3 taken along sectional line I-I', according to exemplary embodiments.

Referring to FIG. 4, the display panel 10 includes the first display substrate SUB1, the second display substrate SUB2, and the liquid crystal layer LC. The liquid crystal layer LC is disposed between the first display substrate SUB1 and the second display substrate SUB2 to, for instance, control transmittance of light passing therethrough.

The second display substrate SUB2 includes an insulating substrate 11, a black matrix BM, a color filter CF, and an insulating layer INS.

The insulating substrate 11 may be or including any suitable material, such as, for example, a transparent insulating substrate material of or including, for instance, glass, plastic, etc.

The black matrix BM is disposed on the insulating substrate 11 to absorb (or otherwise block) incident light from passing therethrough. Accordingly, those area overlapped by the black matrix BM in a plan view may correspond to non-display areas NA in which an image is not displayed. In this manner, those areas not overlapped with the black matrix BM in a plan view may correspond to display areas DA in which an image may be displayed.

The color filter CF is disposed on the black matrix BM. The color filter CF is configured to affect the color of light passing therethrough. The color filter CF includes one or more color filters, such as, one or more red R, green G, blue B, and white W color filters. It is contemplated, however, that any suitable color may be utilized.

The insulating layer INS is disposed on the color filter CF. The insulating layer INS is formed of any suitable insulating material. According to exemplary embodiments, the insulating layer INS is configured to planarize a lower surface of the color filter CF.

Although not shown in the figures, the display panel 10 may further include a one or more (e.g., a pair) of alignment layers arranged to face each other, such that the liquid crystal layer LC may be disposed therebetween. The alignment layers may be configured to initially align liquid crystal molecules of the liquid crystal layer LC in or more pre-tilt directions. Further, even though not shown in figures, the display panel 10 may further include one or more (e.g., a pair) of polarizing plates arranged to face each other, such that the first and second display substrates SUB1 and SUB2 may be disposed therebetween.

According to exemplary embodiments, the touch substrate 20 may include a material having a refractive index greater than the refractive index of air, e.g., greater than one (1). For instance, the touch substrate 20 may be formed of or include acrylic resin, polymethyl methacrylate (PMMA) resin, etc. For example, the touch substrate 20 may be formed of the acrylic resin having the refractive index of about 1.5.

In exemplary embodiments, the touch substrate 20 may be formed by an imprinting process; however, it is contemplated that any one or more suitable manufacturing processes may be utilized. To this end, a mold including protrusions respectively corresponding to the optical recesses PV1 to PV25 of the touch substrate 20 is prepared. An ultraviolet ray-curable resin is coated on the surface of the mold, on which the protrusions are formed. The ultraviolet ray-curable resin is cured. When the cured resin and the mold are separated from each other, the touch substrate 20 is formed.

Referring to FIGS. 3 and 4, the optical recesses PV1 to PV25 are filled with the air. It is contemplated, however, that the optical recesses PV1 to PV25 may be filled with one or more gas, liquid, and/or solid materials.

Among the optical recesses PV1 to PV25, the optical recesses arranged in the first direction DR1 have, according to exemplary embodiments, different depths from each other. The depths of the optical recesses arranged in the first direction DR1 may, for instance, gradually increase or decrease along the first direction DR1. It is also contemplated that any other suitable arrangement of respective depths of the optical recesses PV1 to PV25 may be utilized.

As seen in FIG. 4, the depths of the optical recesses PV1 to PV5 gradually become smaller from the first optical recess PV1 to the fifth optical recess PV5. To this end, with reference to FIG. 3, the depths of the optical recesses PV6 to PV10 may also gradually become smaller from the sixth optical recess PV6 to the tenth optical recess PV10. Likewise, the depths of the optical recesses PV11 to PV15 may gradually become smaller from the eleventh optical recess PV11 to the fifteenth optical recess PV15, the depths of the optical recesses PV16 to PV20 may gradually become smaller from the sixteenth optical recess PV16 to the twentieth optical recess PV20, and the depths of the optical recesses PV21 to PV25 may gradually become smaller from the twenty-first optical recess PV21 to the twenty-fifth optical recess PV25.

According to exemplary embodiments, the optical recesses PV1 to PV25 arranged in the same column along the second direction DR2 may have the same depth. That is, the first optical recess PV1, the sixth optical recess PV6, the eleventh optical recess PV11, the sixteenth recess PV16, and the twenty-first optical recess PV21 may have the same depth. Similarly, the second optical recess PV2, the seventh optical recess PV7, the twelfth optical recess PV12, the seventeenth recess PV17, and the twenty-second optical recess PV22 may have the same depth, as may the third optical recess PV3, the eighth optical recess PV8, the thirteenth optical recess PV13, the eighteenth recess PV18, and the twenty-third optical recess PV23. Likewise, the fourth optical recess PV4, the ninth optical recess PV9, the fourteenth optical recess PV14, the nineteenth recess PV19, and the twenty-fourth optical recess PV24 may have the same depth, as may the fifth optical recess PV5, the tenth optical recess PV10, the fifteenth optical recess PV15, the twelfth recess PV20, and the twenty-fifth optical recess PV25.

As seen in FIG. 4, the depth hl of the first optical recess PV1 may be divided into five equal parts separating six respective depths correspondingly represented by depth markers I to VI. That is, a position located at the same height as the upper surface of the touch substrate 20 may be represented as a position I, and a position corresponding to a maximum depth of the first optical recess PV1 may be represented as a position VI. To this end, positions II to V may represent depths between position I and position VI.

Figure 5:
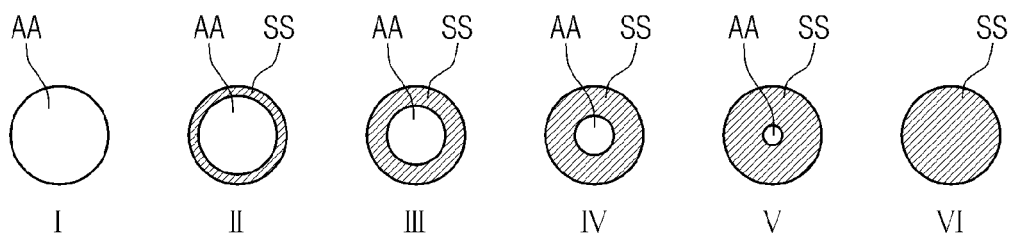
FIG. 5 is a plan view of an optical recess at various depths, according to exemplary embodiments.
Figure 6:
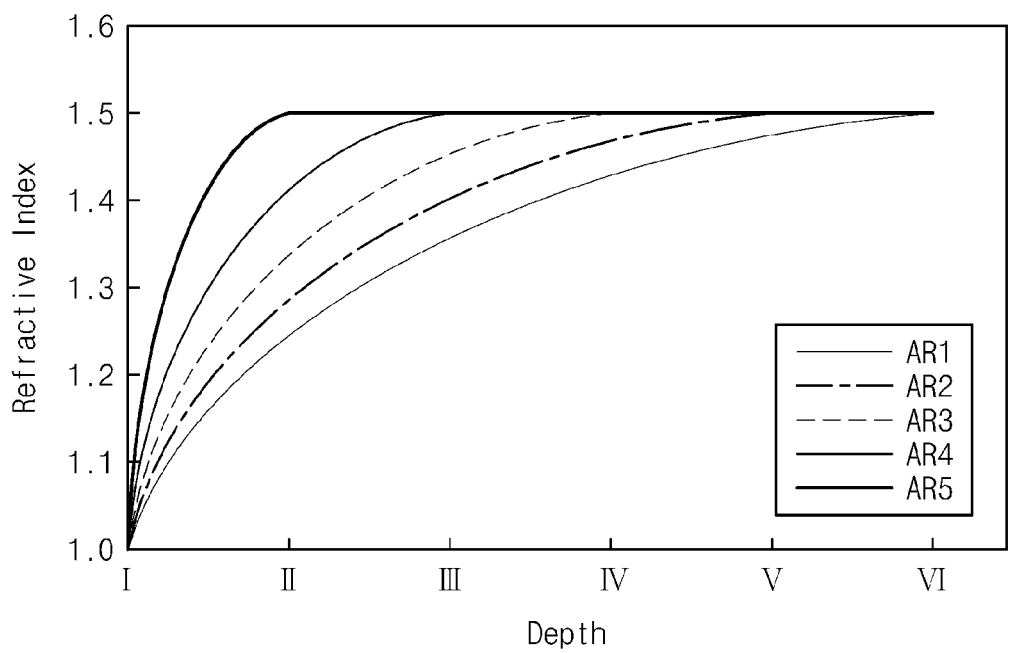
FIG. 6 is a graph comparing variation in refractive index with the depth of an optical recess, according to exemplary embodiments.

FIG. 5 is a plan view of an optical recess at various depths, according to exemplary embodiments. FIG. 6 is a graph comparing variation in refractive index with the depth of an optical recess, according to exemplary embodiments.

Referring to FIGS. 4 to 6, the amount of light reflected from the first to fifth optical recesses PV1 to PV5 may increase from the first optical recess PV1 to the fifth optical recess PV5.

According to exemplary embodiments, the first area AR1 includes the first optical recess PV1. The first area AR1 has a cylindrical shape with an upper circle coincident with the upper circle of the reversed cone shape of the first optical recess PV1 and a lower circle coincident with the tip of the reversed cone shape as its bottom surface. It is contemplated, however, that when the shape of the frustum defining the optical recesses change, the "circle shape" illustrated in the various figures will, instead, correspond to the cross-sectional shape of the corresponding frustum. For instance, a square frustum will have upper and lower squares versus upper and lower circles, as in the case of a truncated cone. As seen in FIG. 4, a height h1 of the first area A1 corresponds to the height h1 of the reversed cone shape. To this end, the first area AR1 is configured to include a portion of the touch substrate 20 and the void (or cavity) caused by the first optical recess PV1.

The second to fifth areas AR2 to AR5 include the second to fifth optical recesses PV2 to PV5, respectively. Each of the second to fifth areas AR2 to AR5 is configured substantially similar to that of the first area AR1. It is noted, however, that the respective depths of the optical recesses PV1 to PV5 become smaller from the first area AR1 to the fifth area AR5. To this end, the refractive indices of the first to fifth optical recesses PV1 to PV5 also increase from the first to fifth optical recess PV1 to PV5. In exemplary embodiments the index of refraction of the fifth optical recess PV5 is about 1.5. It is noted that when the depth of the optical recess becomes smaller, the refractive index approaches about 1.5.

According to exemplary embodiments, the refractive index at the position of the first area AR1 is equal (or substantially equal) to the refractive index of air, e.g., 1. Since a ratio of the portion SS of the touch substrate 20 to the air AA increases from the position I toward the position VI when viewed in a plan view, the refractive index of the first area AR1 becomes closer to about 1.5. The refractive index at the position VI of the first area AR1 is about 1.5 corresponding to the refractive index of the portion SS of the touch substrate 20.

The refractive index at the position I of the fifth area AR5 is about 1. The refractive index becomes closer to about 1.5 from the position I to the position VI, and the refractive index at the position II of the fifth area AR5 is about 1.5. That is, the refractive index from the position II to the position VI of the fifth area AR5 is about 1.5 corresponding to the refractive index of the portion SS of the touch substrate 20.

In the same way, the refractive index of the second area AR2 to the fourth area AR4 has the refractive index between the refractive index of the first area AR1 and the refractive index of the fifth area AR5, and, as such, to avoid obscuring exemplary embodiments described herein, duplicative descriptions have been omitted with respect to the second to fourth areas AR2 to AR4.

According to exemplary embodiments, the average of the refractive indices increases from the first area AR1 toward the fifth area AR5. When the refractive index is high, the amount of the reflected light is increased. In this manner, the amount of reflected light is increased from the first optical recess PV1 to the fifth optical recess PV5.

Figure 7:
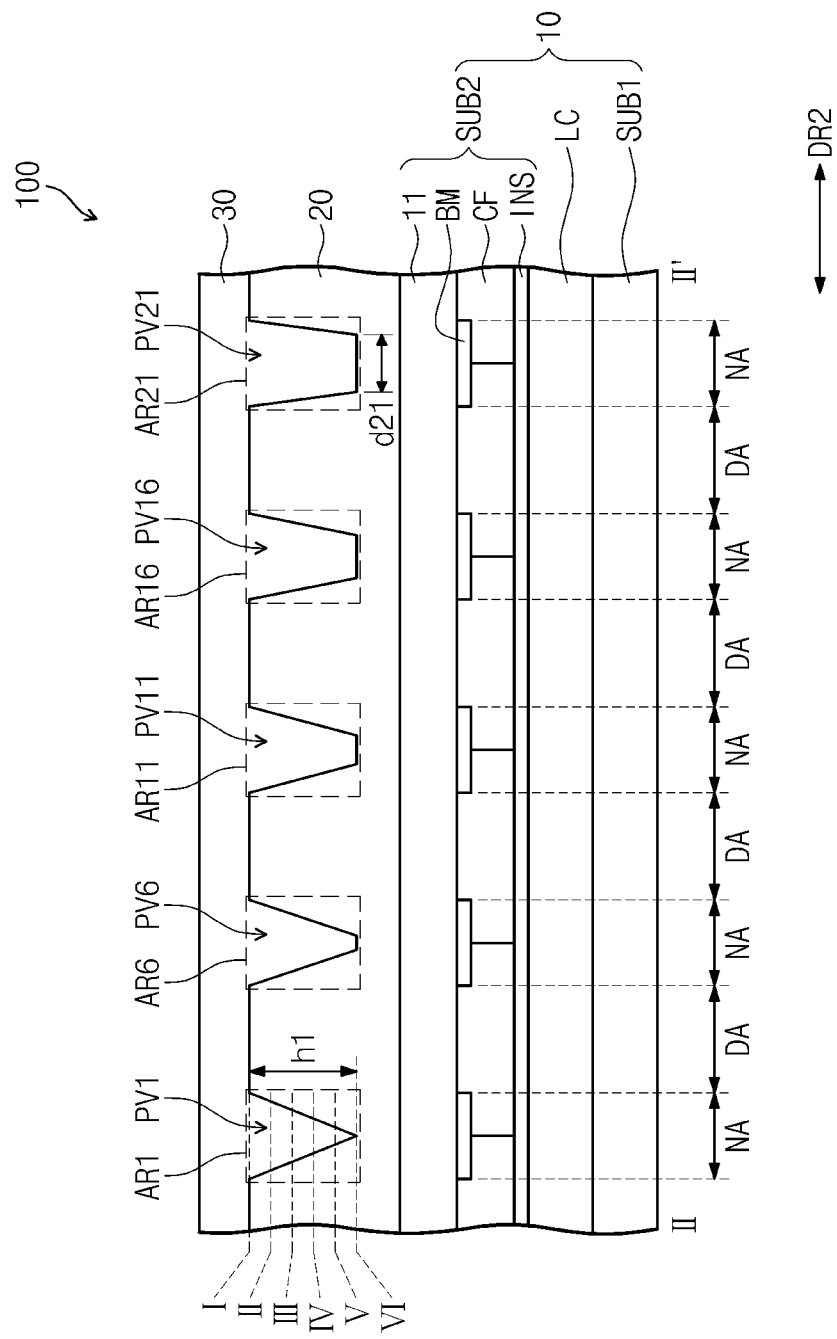
FIG. 7 is a cross-sectional view of the touch substrate of FIG. 3 taken along sectional line II-II', according to exemplary embodiments.

FIG. 7 is a cross-sectional view of the touch substrate of FIG. 3 taken along sectional line II-II', according to exemplary embodiments.

Referring to FIGS. 3 and 7, among the optical recesses PV1 to PV25, the optical recesses arranged in the second direction DR2 have different medium contact surfaces from each other. The medium contact surfaces of the optical recesses arranged in the second direction DR2 gradually increase or decrease along the second direction DR2. Here, the medium contact surface may be a vertex of the reversed cone shape of the optical recesses PV1 to PV25 or a lower circle of the reversed-truncated cone shape (or frustum). In this manner, the medium contact surface may become wider from the first optical recess PV1 to the twenty-first optical recess PV21, as seen in FIG. 7.

According to exemplary embodiments, the medium contact surface of the first optical recess PV1 corresponds to the vertex of the cone shape, but the medium contact surface of the twenty-first optical recess PV21 (shaped as a frustum) has a circular shape with a diameter d21. The medium contact surface of each of the sixth optical recess PV6, the eleventh optical recess PV11, and the sixteenth optical recess PV16 may have a circular shape smaller than that of the medium contact surface of the twenty-first optical recess PV21. Similarly, the medium contact surface becomes wider from the second optical recess PV2 to the twenty-second optical recess PV22, the medium contact surface becomes wider from the third optical recess PV3 to the twenty-third optical recess PV23, the medium contact surface becomes wider from the fourth optical recess PV4 to the twenty-fourth optical recess PV24, and the medium contact surface becomes wider from the fifth optical recess PV5 to the twenty-fifth optical recess PV25.

In exemplary embodiments, optical recesses arranged in the same row along the first direction DR1 have a medium contact surface of a similar area. That is, the first to fifth optical recesses PV1 to PV5 have a medium contact surface of the same area, the sixth to tenth optical recesses PV6 to PV10 have a medium contact surface of the same area, the eleventh to fifteenth optical recesses PV11 to PV15 a medium contact surface of the same area, the sixteenth to twentieth optical recesses PV16 to PV20 have a medium contact surface of the same area, and the twenty-first to twenty-fifth optical recesses PV21 to PV25 have a medium contact surface of the same area. It is contemplated, however, that one or more of the areas of the various medium contact surfaces may be different than as previously described, and, as such, the pattern of various medium contact surfaces may be based on any other suitable arrangement scheme, including an arbitrary arrangement scheme.

As seen in FIG. 7, the depth h1 of the first optical recess PV1 may be divided into five equal parts separating six respective depths correspondingly represented by depth markers I to VI. That is, a position located at the same height as the upper surface of the touch substrate 20 may be represented as a position I, and a position corresponding to a maximum depth of the first optical recess PV1 may be represented as a position VI. To this end, positions II to V may represent depths between position I and position VI.

Figure 8:
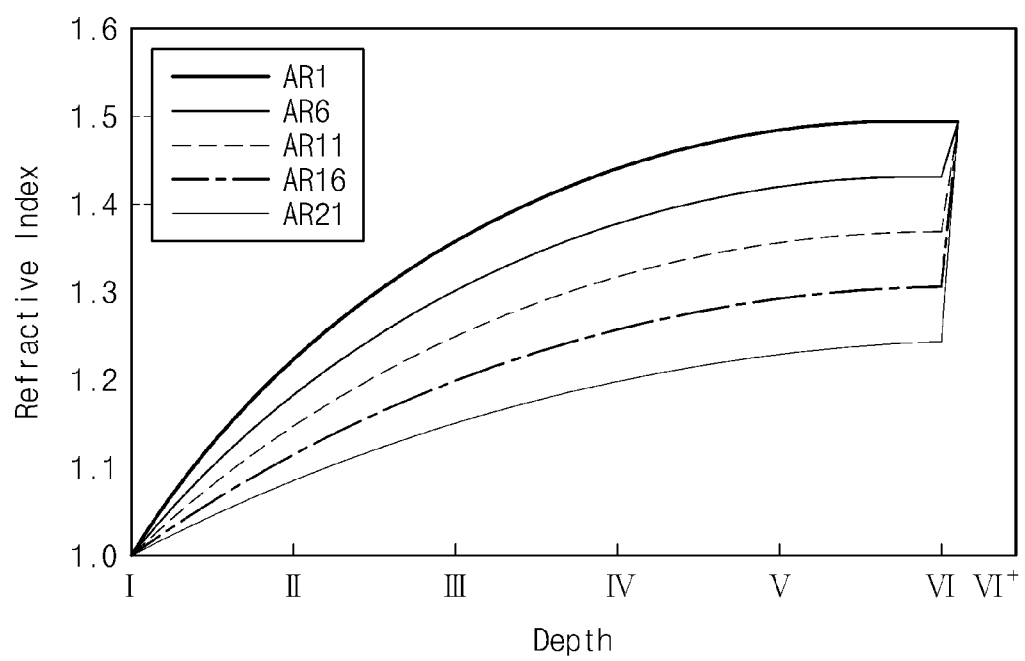
FIG. 8 is a graph comparing variation in refractive index with the depths of the first, sixth, eleventh, sixteenth, and twenty-first optical recesses of FIG. 7, according to exemplary embodiments.

FIG. 8 is a graph comparing variation in refractive index with the depths of the first, sixth, eleventh, sixteenth, and twenty-first optical recesses of FIG. 7, according to exemplary embodiments.

As seen in FIG. 7, the first, sixth, eleventh, sixteenth, and twenty-first areas AR1, AR6, AR11, AR16, and AR21 include the first, sixth, eleventh, sixteenth, and twenty-first optical recesses PV1, PV6, PV11, PV16, and PV21, respectively. The first, sixth, eleventh, sixteenth, and twenty-first areas AR1, AR6, AR11, AR16, and AR21 have, in exemplary embodiments, the same shape. This has been previously described with reference to FIG. 4, and, as such, duplicative descriptions will be omitted to avoid obscuring exemplary embodiments described herein.

Referring to FIGS. 7 and 8, the amount of reflected light by the optical recesses PV1, PV6, PV11, PV16, and PV21 is increased from the first optical recess PV1 to the twenty-first optical recess PV21. To this end, it is noted that the refractive index may be rapidly varied at the medium contact surface from the first area AR1 to the twenty-first area AR21. This rapid variance in the index of refraction is illustrated at the far right of the respective plots shown in FIG. 8. When the area of the medium contact surface of the optical recesses becomes larger, the refractive index is rapidly varied at the position near the position VI. In this manner, the refractive index rapidly approaches about 1.5 at the position near the position VI in order of the first area AR1, the sixth area AR6, the eleventh area AR11, the sixteenth area AR16, and the twenty-first area AR21. In FIG. 8, a position VI+ indicates a position infinitely closer to the position VI in an infinite-range.

According to exemplary embodiments, the refractive index at the position I of the first area AR1 is about 1, and the refractive index of the first area AR1 becomes closer to about 1.5 from the position I to the position VI. The refractive index at the position VI of the first area AR1 is about 1.5 and the refractive index at the position VI+ of the first area AR1 is about 1.5. That is, the refractive index of the first area AR1 is gradually varied according to its position.

The refractive index at the position I of the sixth area AR6 is about 1. The refractive index of the sixth area AR6 gradually increases from the position I to the position VI and becomes about 1.42 at the position VI. The refractive index at the position VI+ of the sixth area AR6 is about 1.5 corresponding to the refractive index of the material for the touch substrate 20. That is, the refractive index of the sixth area AR6 is rapidly varied between the position VI and the position VI+.

Similarly, the refractive index of each of the eleventh, sixteenth, and twenty-first areas AR11, AR16, and AR21 is rapidly varied between the position VI and the position VI+. In this manner, the variation of the refractive index between the position VI and the position VI+ becomes rapid in each of the first to the twenty-first areas AR1 to AR21. Accordingly, as the variation of the refractive index becomes rapid, the amount of the reflected light is increased. As such, the amount of the reflected light increases from the first optical recess PV1 to the twenty-first optical recess PV21.

Adverting back to FIG. 3, the amount of the reflected light by each of the first to twenty-fifth optical recesses PV1 to PV25 is increased in order of the first to twenty-fifth optical recesses PV1 to PV25. In other words, the amount of the reflected light by the fifth optical recess PV5 is smaller than the amount of the reflected light by the sixth optical recess PV6. Similarly, the amount of the reflected light by the tenth optical recess PV10 is smaller than the amount of the reflected light by the eleventh optical recess PV11, the amount of the reflected light by the fifteenth optical recess PV15 is smaller than the amount of the reflected light by the sixteenth optical recess PV16, and the amount of the reflected light by the twentieth optical recess PV20 is smaller than the amount of the reflected light by the twenty-first optical recess PV21. In this manner, the amount of the reflected light may be determined and modified based on and by adjusting the depth of the optical recesses PV1 to PV25 and/or the area of the medium contact surface of the optical recesses PV1 to PV25.

As described above, the optical recesses PV1 to PV25 have different depths in the first direction DR1 and different areas of the medium contact surface in the second direction DR2, but exemplary embodiments are not so limited. In other words, any suitable configuration to achieve the variance in the amount of the reflected light by the optical recesses PV1 to PV25 may be utilized. According to embodiments, the optical recesses PV1 to PV25 may have different depths and the same area of medium contact surface. In addition, according to embodiments, the optical recesses PV1 to PV25 may have the same depth and different areas of medium contact surface.

Figure 9:
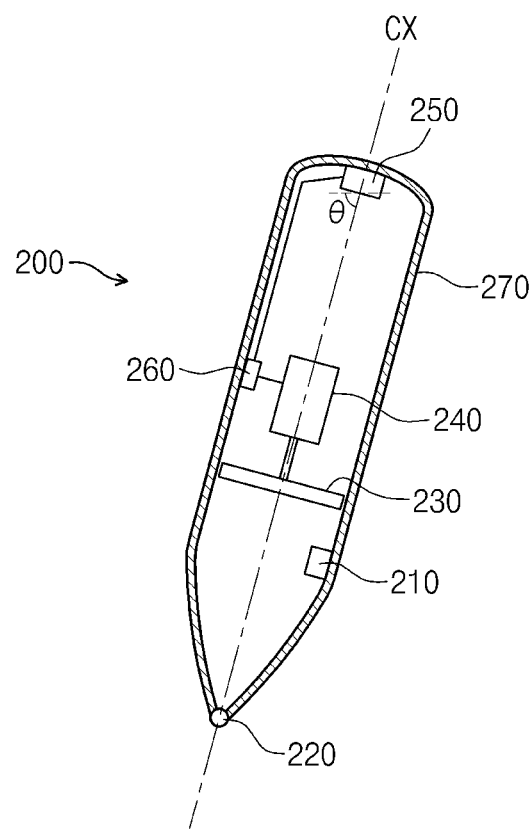
FIG. 9 is a cross-sectional view of an optical pen (or element) of the optical touch system of FIG. 1, according to exemplary embodiments.

FIG. 9 is a cross-sectional view of the optical pen (or element) 200 of the optical system 1000 of FIG. 1, according to exemplary embodiments.

Referring to FIGS. 1 and 9, the optical pen 200 includes a light source 210, a pen tip 220, a reflected light sensor 230, a photoelectric processor 240, an angle sensor 250, a wireless transmitter 260, and a case 270. While specific reference will be made to this particular implementation, it is also contemplated that the optical pen 200 may embody many forms and include multiple and/or alternative components and configurations.

According to exemplary embodiments, the light source 210 is configured to emit light, e.g., an infrared ray, to the pen tip 220. The light source 210 may be fixed to the case 270 in an area near the pen tip 220.

The pen tip 220 is disposed to correspond to an opening formed through an end portion of the case 270. Light emitted from the light source 210 is radiated towards the upper surface of the display device 100 after passing through the pen tip 220. In this manner, the cross-sectional shape of a light beam that reaches the upper surface of the display device 100 after passing through the pen tip 220 may be controlled based on the cross-sectional shape of the pen tip 220. According to exemplary embodiments, the pen tip 220 may have a spherical shape; however, any other suitable confirmation may be utilized.

The reflected light sensor 230 is configured to receive and detect light reflected from the display device 100. In other words, a portion of the light emitted from the light source 210 may be reflected by one or more of the optical recesses PV1 to PV25 formed in the touch substrate 20 and made incident to the reflected light sensor 230 after passing through the pen tip 220. Hereinafter, the portion of the light emitted from the light source 210 and incident to the reflected light sensor 230 is referred to as the reflected light.

According to exemplary embodiments, the reflected light sensor 230 is configured to include one or more sensors to detect the reflected light. For instance, the one or more sensors may be complementary metal-oxide semiconductor (CMOS) image sensors, charge-coupled devices (CCD), and/or the like. The photoelectric processor 240 is configured to generate reflected light data corresponding to the reflected light detected by the reflected light sensor 230. The reflected light data is generated by, for example, converting the reflected light into corresponding voltage data. To this end, the photoelectric processor 240 may perform a calibration process in order to improve reliability of the reflected light data. The calibration process may be performed by removing influences from the reflected light, which are caused by ambient light and/or light reflected from the upper surface of the touch substrate 20 except for the optical recesses PV1 to PV25. The photoelectric processor 240 is configured to provide the reflected light data to the wireless transmitter 260 for transmission to, for instance, the coordinate calculator 70.

In exemplary embodiments, the angle sensor 250 is configured to sense an angle θ of a center axis of the optical pen 200 inclined with respect to the upper surface of the display device 100. The angle senor 250 may be utilized to precisely calculate (or otherwise determine) the touch coordinate since the amount of the reflected light may be varied depending on a slope of the optical pen 200. The angle sensor 250 may be a gyro sensor, an acceleration sensor, and/or the like, and, therefore, may be any suitable component utilized to determine the slope of the optical pen 200. The angle sensor 250 may be disposed at another end portion of the case 270 to be opposite to the pen tip 220, and, thereby, in a position to detect a maximum angular momentum (or disposition) of the optical pen 200. The angle sensor 250 is configured to provide the angle data about the slope of the optical pen 200 to the wireless transmitter 260 for transmission to, for instance, the coordinate calculator 70.

The wireless transmitter 260 is configured to transmit the reflected light data and the angle data to the display device 100, e.g., to the coordinate calculator 70. It is noted that, in exemplary embodiments, when the coordinate calculator 70 is implemented via one or more processors of an apparatus (e.g. a mobile phone) including the display device 100, the reflected light data and the angle data may be transmitted (or otherwise provided) to the one or more processors for determination of the coordinate information. In exemplary embodiments, the wireless transmitter 260 may be configured to provide the reflected light data and the angle data to the display device 100 via, for instance, a wireless local area network, e.g., bluetooth, wireless fidelity (WiFi), infrared, etc. It is contemplated, however, that any suitable wireless network may be utilized.

The case 270 is configured to accommodate and, thereby, support the light source 210, the reflected light sensor 230, the photoelectric process 240, the angle sensor 250, and the wireless transmitter 260 therein and/or thereon.

Figure 10:
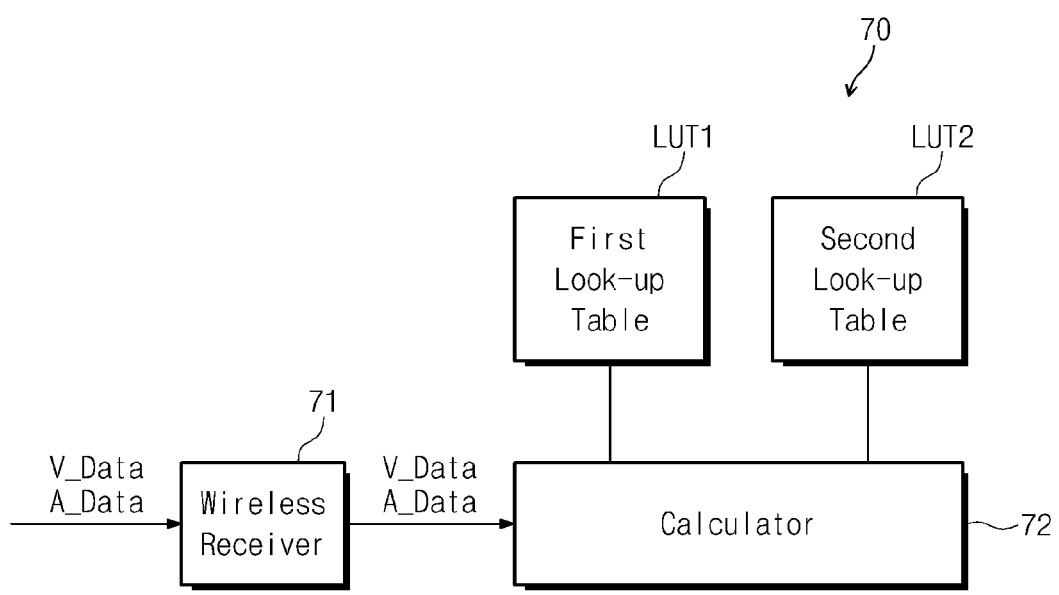
FIG. 10 is a block diagram of a coordinate calculator of the optical touch system of FIG. 2, according to exemplary embodiments.

FIG. 10 is a block diagram of the coordinate calculator of the optical touch system of FIG. 2, according to exemplary embodiments.

Referring to FIG. 10, the coordinate calculator 70 includes a wireless receiver 71, a first look-up table LUT1, a second look-up table LUT2, and a calculator (or processor) 72. It is noted that while specific reference will be made to this particular implementation, it is also contemplated that the coordinator calculator 70 may embody many forms and include multiple and/or alternative components and configurations. For instance, one or more components of an apparatus including the display device 100 may be configured to implement the coordinator calculator 70. Namely, a wireless receiver, memory, and one or more processor of the apparatus (e.g., mobile phone, computing device, tablet, etc.) may be configured to implement one or more of the features/functions described in association with the coordinator calculator 70.

According to exemplary embodiments, the wireless receiver 71 is configured to receive wireless communications from the wireless transmitter 260 shown in FIG. 9 and, thereby, configured to receive the reflected light data V_Data and the angle data A_Data. The wireless receiver 71 is configured to provide the reflected light data V_Data and the angle data A_Data to the calculator 72.

The first look-up table LUT1 is configured to store a compensation value according to the slope of the optical pen 200.

The second look-up table LUT2 is configured to store an inherent reflection amount of each optical recess.

According to exemplary embodiments, the calculator 72 is configured to read out (or otherwise determine) a compensation value corresponding to the angle data A_Data from the first look-up table LUT1 and compensate for the reflected light data V_Data to generate compensated-reflected light data. The compensated-reflected light data is obtained by converting the reflected light data to a specific case in which the optical pen 200 has a specific slope. In addition, the calculator 72 is configured to calculate the touch coordinate on the basis of the compensated-reflected light data and the reflection amount of the optical recesses, which is read out (or otherwise determined) from the second look-up table LUT2.

Figure 11:
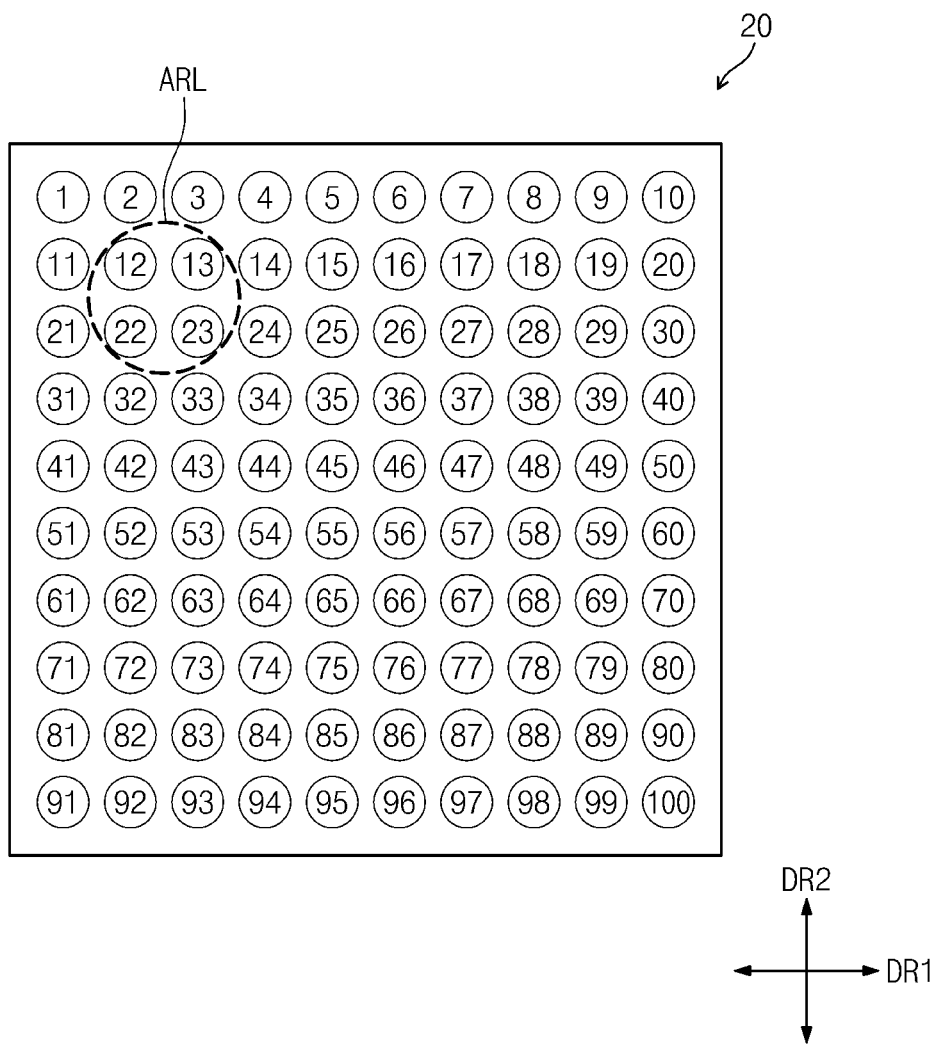
FIG. 11 is an annotated plan view of a touch substrate of the optical touch system of FIG. 2 to facilitate explanation of an illustrative operation of the coordinator calculator of FIG. 10, according to exemplary embodiments.

FIG. 11 is an annotated plan view of the touch substrate 20 of the optical touch system 1000 of FIG. 2 to facilitate explanation of an illustrative operation of the coordinator calculator 70 of FIG. 10, according to exemplary embodiments.

As seen in FIG. 11, the optical recesses are arranged in ten rows by ten columns on the touch substrate 20. The numeral stated in each optical recess indicates the number of each optical recess and the relative amount of reflection of incident light associated with each corresponding optical recess. For instance, the relative reflection amount of the first optical recess shown in FIG. 11 is about 1 and the relative reflection amount of the hundredth optical recess shown in FIG. 11 is about 100. The reflection amounts of the first to hundredth optical recesses may be stored in the second look-up table LUT2 shown in FIG. 10 as 1 to 100.

According to exemplary embodiments, the area ARL is an area upon which light from optical pen 200 is made incident to the touch substrate 20 in a plan view. The area ARL may be determined, and, thereby, controlled based on a size of the pen tip 220 shown in FIG. 9. FIG. 11 shows the area ARL of the light incident to the touch substrate 20 in a plan view, which corresponds to the optical recesses PV12, PV13, PV22, and PV23 arranged in two rows by two columns.

Referring to FIGS. 10 and 11, when assuming that the compensated-reflected light data has information associated with a light amount of 70, the following Equation 1 is established by the reflection amount of the optical recesses, which is read out from the second look-up table LUT2, and the compensated-reflected light data.

$$70 = n + (n+1) + (n+10) + (n+11) \quad \text{Eq. (1)}$$

In this manner, the calculator 72 is configured to calculate "12" as "n" on the basis of the Equation, and then determine the positions of the twelfth, thirteenth, twenty-second, and twenty-third optical recesses as the touch coordinate.

According to exemplary embodiments, the display device 100 includes the touch substrate 20 having the optical recesses to calculate the touch coordinate, but does not need to include a separate optical sensor or a separate touch electrode.

As described above, since the display device does not require the separate optical sensor/touch electrode, a manufacturing process of the display device 100 is simplified and a manufacturing cost, time, and complexity of the display device 100 is reduced. In addition, since the display device 100 does not require the separate touch electrode, a mask required to form the touch electrode is not required. Therefore, the manufacturing cost, time, and complexity may be further reduced.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
 a display panel configured to display an image;
 a touch substrate disposed on the display panel, the touch substrate comprising optical recesses each configured to reflect respectively different amounts of incident light; and
 a protective layer disposed on the touch substrate.

2. The display device of claim 1, wherein each of the optical recesses has a reversed cone shape or a reversed-truncated cone shape.

3. The display device of claim 1, wherein a peripheral edge of each of the optical recesses is similarly shaped and encloses substantially the same amount of area.

4. The display device of claim 3, wherein the optical recesses are spaced apart from each other and arranged in a matrix formation of "j" rows and "h" columns, where "j" and "h" are natural, real numbers.

5. The display device of claim 4, wherein at least some of the optical recesses have different depths.

6. The display device of claim 4, wherein at least some of the optical recesses have different medium contact surface areas.

7. The display device of claim 4, wherein:
 the optical recesses arranged in the same row have different depths; and
 the optical recesses arranged in the same column have different medium contact surface areas.

8. The display device of claim 7, wherein the depth of the optical recesses arranged in the same row increases or decreases along the row.

9. The display device of claim 8, wherein the optical recesses arranged in the same row have the same medium contact surface area.

10. The display device of claim 7, wherein the medium contact surface area of the optical recesses arranged in the same column gradually increases or decreases along the column.

11. The display device of claim 10, wherein the optical recesses arranged in the same column have the same depth.

12. The display device of claim 1, wherein the optical recesses comprise one or more gasses.

13. The display device of claim 1, wherein the touch substrate comprises an acrylic resin or a polymethyl methacrylate (PMMA) resin.

14. The display device of claim 1, wherein the display panel comprises:
 a first display substrate;
 a second display substrate facing the first display substrate; and
 a liquid crystal layer disposed between the first display substrate and the second display substrate,
 wherein the second display substrate comprises:
  an insulating substrate,
  a black matrix disposed on the insulating substrate, and
  a color filter disposed on the black matrix.

15. The display device of claim 14, wherein the optical recesses cover respective portions of the black matrix.

16. An optical touch system, comprising:
 a coordinate processor;
 a display device; and
 an optical element configured to emit light towards the display device and provide information about reflected light corresponding to a portion of the emitted light to the coordinate processor, the display device, comprising:
  a display panel configured to display an image,
  a touch substrate disposed on the display panel, the touch substrate comprising optical recesses each configured to reflect respective amounts of incident light, and
  a protective layer disposed on the touch substrate,
 wherein the coordinate processor is configured to determine a touch or near-touch coordinate based on the information received from the optical element.

17. The optical touch system of claim 16, wherein each of the optical recesses has a reversed cone shape or a reversed-truncated cone shape.

18. The optical touch system of claim 16, wherein a peripheral edge of each of the optical recesses is similarly shaped and encloses substantially the same amount of area.

19. The optical touch system of claim 18, wherein the optical recesses are spaced apart from each other and arranged in a matrix formation of "j" rows by "h" columns, where "j" and "h" are natural, real numbers.

20. The optical touch system of claim 19, wherein the optical recesses arranged in the same row have different depths and the optical recesses arranged in the same column have different medium contact surface areas.

21. The optical touch system of claim 20, wherein the depth of the optical recesses arranged in the same row gradually increases or decreases along the row.

22. The optical touch system of claim 20, wherein the medium contact surface area of the optical recesses arranged in the same column gradually increases or decreases along the column.

23. The optical touch system of claim 16, wherein the optical element comprises:
   a light source configured to emit light;
   a reflected light sensor configured to detect reflected light reflected from the display device, the reflected light corresponding to at least some of the emitted light;
   a photoelectric processor configured to generate reflected light data corresponding to the detected, reflected light;
   a wireless transmitter configured to provide the reflected light data to the coordinate processor; and
   a case configured to support the light source, the reflected light sensor, the photoelectric processor, and the wireless transmitter.

24. The optical touch system of claim 23, wherein:
   the optical element further comprises an angle sensor configured to:
      sense a tilt angle of the optical element with respect to an upper surface of the display device, and
      generate angle data based on the tilt angle; and
   the wireless transmitter is configured to provide the angle data to the coordinate processor.

25. The optical touch system of claim 24, wherein the coordinate processor comprises:
   a wireless receiver configured to receive the reflected light data and the angle data;
   a first look-up table configured to store compensation values according to slopes of the optical element; and
   a second look-up table configured to store reflection amounts of the optical recesses; and
   a processor configured to determine the touch or near-touch coordinate based on the reflected light data, the angle data, the first look-up table, and the second look-up table.

26. The optical touch system of claim 25, wherein the processor of the coordinate processor is configured to:
   determine a compensation value from the first look-up table based on the angle data;
   compensate the reflected light data to generate compensated-reflected light data; and
   determine the touch or near-touch coordinate based on the compensated-reflected light data and the reflection amount of the optical recesses based on information stored in association with the second look-up table.

27. The display device of claim 1, wherein touch or near-touch events associated with the display device are detected based on the respective amounts of incident light reflected from the optical recesses.

* * * * *